United States Patent
Yu et al.

(10) Patent No.: US 11,467,528 B2
(45) Date of Patent: Oct. 11, 2022

(54) UNIVERSAL COUPLER WITH COUPLER HOLDER AND DRIVING COUPLER ELASTICALLY COMBINED WITH EACH OTHER

(71) Applicant: Hewlett-Packard Development Company, L.P., Spring, TX (US)

(72) Inventors: Jaeil Yu, Suwon (KR); Taeil Jung, Suwon (KR); Tae-Hee Kim, Suwon (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/416,678

(22) PCT Filed: Jun. 10, 2020

(86) PCT No.: PCT/US2020/036949
§ 371 (c)(1),
(2) Date: Jun. 21, 2021

(87) PCT Pub. No.: WO2020/257020
PCT Pub. Date: Dec. 24, 2020

(65) Prior Publication Data
US 2022/0100138 A1   Mar. 31, 2022

(30) Foreign Application Priority Data

Jun. 20, 2019 (KR) .................. 10-2019-0073587

(51) Int. Cl.
*G03G 15/00* (2006.01)
*G03G 21/16* (2006.01)
(Continued)

(52) U.S. Cl.
CPC ......... *G03G 15/757* (2013.01); *F16D 3/2052* (2013.01); *G03G 21/1647* (2013.01); *G03G 21/186* (2013.01); *G03G 2221/1657* (2013.01)

(58) Field of Classification Search
CPC ............. G03G 15/757; G03G 21/1647; G03G 21/186; G03G 2221/1657; F16D 1/00;
(Continued)

(56) References Cited

U.S. PATENT DOCUMENTS

| 5,816,926 A | 10/1998 | Lynch et al. |
| 6,671,475 B2 | 12/2003 | Katada et al. |

(Continued)

FOREIGN PATENT DOCUMENTS

| JP | 1988312516 | 12/1998 |
| JP | 2002341658 | 11/2002 |

(Continued)

*Primary Examiner* — Sophia S Chen
(74) *Attorney, Agent, or Firm* — Jefferson IP Law, LLP

(57) ABSTRACT

A universal coupler includes: a driving shaft, a coupler holder, driving coupler, a driving coupling pin, and an elastic member. The driving shaft has a driving shaft a first pin hole. The coupler holder includes a bore, a separation prevention member that partially blocks the bore, and a coupling groove formed in the bore. The driving coupler includes a spherical portion that is located in the bore and in contact with the separation prevention member, a shaft insertion portion formed through the spherical portion, and a second pin hole that penetrates the spherical portion. The driving coupling pin is insertable into the driving pin hole, and has an end insertable into the coupling groove. The elastic member applies elasticity to the coupler holder in a direction that urges the spherical portion of the driving coupler against the separation prevention member.

15 Claims, 9 Drawing Sheets

(51) Int. Cl.
*F16D 1/10* (2006.01)
*F16D 3/205* (2006.01)
*G03G 21/18* (2006.01)

(58) Field of Classification Search
CPC ..... F16D 1/10; F16D 3/00; F16D 3/16; F16D 3/20; F16D 3/2052; F16D 3/34; F16L 27/023
See application file for complete search history.

(56) References Cited

U.S. PATENT DOCUMENTS

| | | | |
|---|---|---|---|
| 10,185,277 B1* | 1/2019 | Wu | G03G 15/757 |
| 2005/0025523 A1* | 2/2005 | Iwasaki | G03G 15/757 |
| | | | 399/167 |
| 2006/0089202 A1* | 4/2006 | Losi | F16D 3/30 |
| | | | 464/114 |
| 2018/0283460 A1* | 10/2018 | Lock | F16D 3/2052 |

FOREIGN PATENT DOCUMENTS

| | | |
|---|---|---|
| JP | 2009058735 | 3/2009 |
| WO | WO-2008117878 A1 | 10/2008 |
| WO | WO-2009154312 A1 | 12/2009 |
| WO | WO-2011074707 A1 | 6/2011 |
| WO | WO-2013085073 A1 | 6/2013 |

* cited by examiner

UNIVERSAL COUPLER WITH COUPLER HOLDER AND DRIVING COUPLER ELASTICALLY COMBINED WITH EACH OTHER

BACKGROUND

In image forming apparatuses using an electrophotographic method, toner is supplied to an electrostatic latent image on a photoconductor to form a visible toner image on the photoconductor, the toner image is transferred through an intermediate transfer medium or directly to a printing medium, and the transferred toner image is fixed on the printing medium.

The image forming apparatus includes one or more rotational objects. A driving motor may deliver driving power to the rotational object via a driving shaft. A driving shaft and a rotating shaft of the rotational object, that is, a driven shaft, may be connected to each other by a coupler.

DETAILED DESCRIPTION

A driven shaft may be connected to a driving shaft via a flexible coupling structure. In the flexible coupling structure, driving power (rotation power) may be delivered from the driving shaft to the driven shaft even when there is a misalignment between the driving shaft and the driven shaft. A misalignment may include a parallel misalignment, in which the driving shaft and the driven shaft are parallel but are misaligned (e.g., offset from each other such that they do not join together). A misalignment may include an angular misalignment in which the driving shaft and the driven shaft are not parallel to each other but alignment lines meet each other (e.g., the driving shaft and the driven shaft are not parallel to each other but have alignment lines that intersect). In the flexible coupling structure, when there is a misalignment as described above, fluctuation of an angular velocity in the structure may be amplified, and therefore, the performance of a fixed speed rotation of the driven shaft may degrade.

An example universal coupler may minimize the variation of the angular velocity while rotation power is delivered from the driving shaft to the driven shaft and a fixed speed rotation performance may be secured even when there is a misalignment between the driving shaft and the driven shaft.

Figure 1:
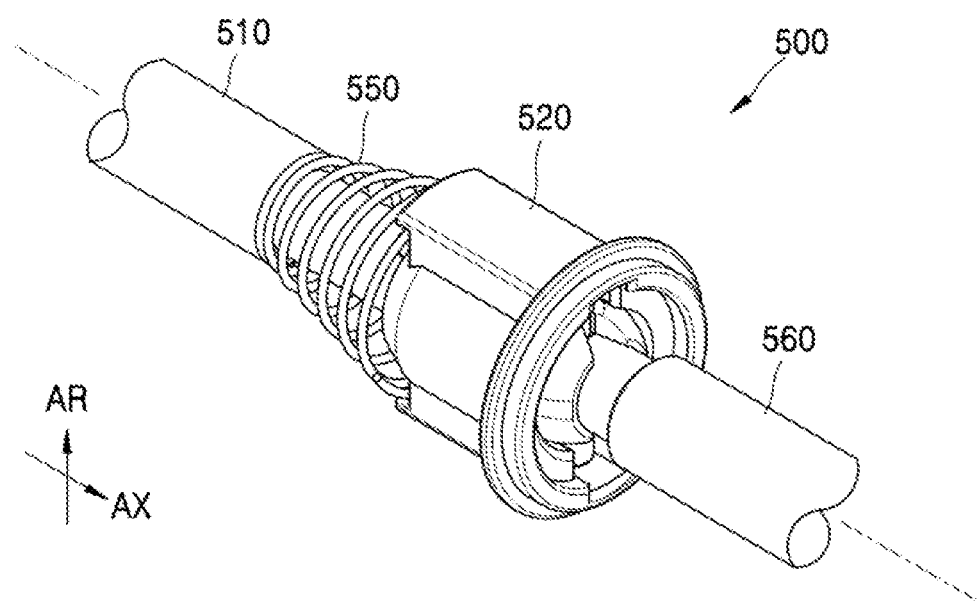
FIG. 1 is a perspective view of an example universal coupler.
Figure 2:
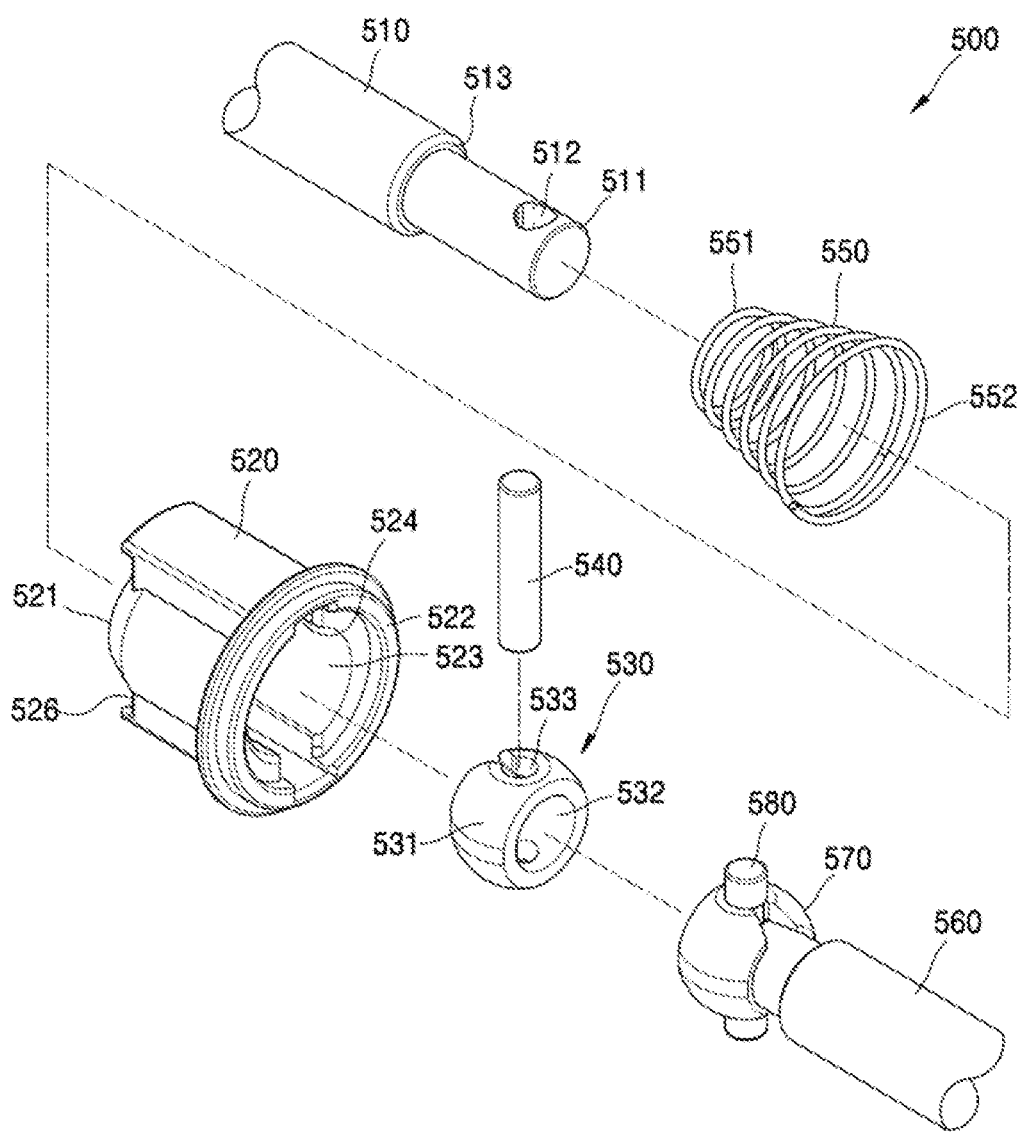
FIG. 2 is an exploded perspective view of the example universal coupler shown in FIG. 1.
Figure 3:
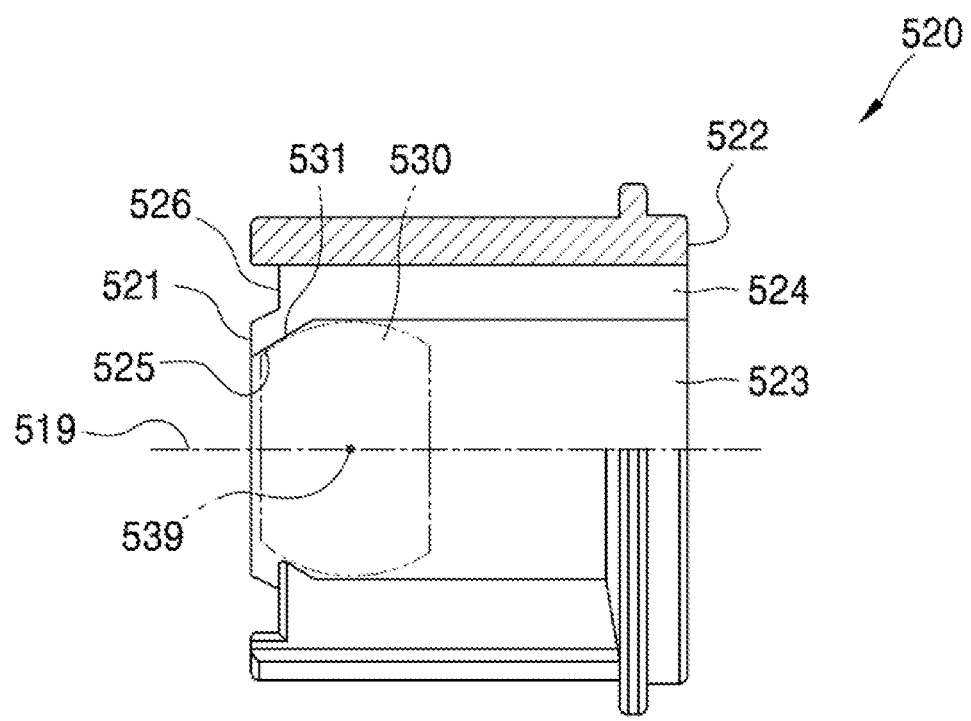
FIG. 3 is a cross-sectional view of an example coupler holder.

FIG. 1 is a perspective view of an example universal coupler 500, and FIG. 2 is an exploded perspective view of the example universal coupler 500 shown in FIG. 1. FIG. 3 is a cross-sectional view of an example coupler holder 520 of universal coupler 500.

Referring to FIGS. 1 to 3, the universal coupler 500 may include a driving shaft 510, a coupler holder 520, a driving coupler 530, a driving coupling pin 540, and an elastic member (e.g, spring member or biasing member) 550. The driving shaft 510 and the coupler holder 520 are connected to each other by the driving coupler 530 and the driving coupling pin 540. A driven shaft 560 receives rotation power (or rotational power) from the driving shaft 510 through the coupler holder 520 and rotates.

A first pin insertion hole 512 is provided at an end portion 511 of the driving shaft 510. The first pin insertion hole 512 is formed through the driving shaft 510 in a radius direction (or radial direction) AR that is orthogonal to an axis direction (or axial direction) AX of the driving shaft 510. The driving shaft 510 is connected to a driving motor and is rotated by the driving motor. The driving shaft 510 may be a rotation shaft of the driving motor. The driving shaft 510 may be connected to the driving motor by a power delivery device (e.g., power delivery unit) such as a gear or belt and rotated by the driving motor.

The coupler holder 520 includes a bore portion 523 which includes a first end portion 521 facing the driving shaft 510 and a second end portion 522 opposite to the first end portion 521, a separation prevention member (e.g., a stopper or a separation prevention unit) 525 that is located at the first end portion 521 and that partially blocks the bore portion 523, and a coupling groove 524 that is formed in the bore portion 523 in a sunk manner. The bore portion 523 may be formed through the coupler holder 520 in the axis direction AX. The separation prevention unit 525 may be in contact with a spherical portion (e.g, spherical member or ball joint) 531 such that the coupler holder 520 may be inclined with respect to the driving shaft 510 having a center 539 of the spherical portion 531 as an origin point. The separation prevention unit 525 may have various forms such as extending along an inclined plane that inclines from the first end portion 521 with respect to the axis direction AX or along a surface that has a radius of curvature substantially identical to a radius of curvature of the spherical portion 531. In some examples, with reference to FIG. 3, the separation prevention unit 525 includes a surface that extends along an inclined plane and that contacts (in point-contact with) the spherical portion 531. The separation prevention unit 525 is in contact with the spherical portion 531 due to elasticity (e.g, biasing force) of the elastic member 550 and prevents the coupler holder 520 from being separated from the spherical portion 531 in the axis direction AX. In addition, the separation prevention unit 525 functions as a supporting member (e.g., supporting unit), together with the bore portion 523, that supports the spherical portion 531 so that the coupler holder 520 may be inclined with respect to the axis direction AX having the center 539 of the spherical portion 531 as an origin point. The coupling groove 524 may extend from the first end portion 521 to the second end portion 522.

The driving coupler 530 may include the spherical portion 531, a shaft insertion portion 532, and a second pin insertion hole 533. The spherical portion 531 is inserted from the second end portion 522 of the coupler holder 520 into the bore portion 523 and is in contact with the separation prevention unit 525 to support the coupler holder 520 to be inclined with respect to the driving shaft 510. The shaft insertion portion 532 is formed through the spherical portion 531 in the axis direction AX to allow the driving shaft 510 to be inserted. The second pin insertion hole 533 penetrates the spherical portion 531 in the radius direction AR. In some examples, the spherical portion 531 may be spherical on the whole. In other examples, at least a portion of the spherical portion 531 may be spherical. For example, a portion that contacts the separation prevention unit 525 when the coupler holder 520 is inclined with respect to the axis direction AX having the center 539 of the spherical portion 531 as an origin point may be spherical. In a state where the spherical portion 531 is in contact with the bore portion 523 and the separation prevention unit 525, the coupler holder 520 may be inclined with respect to the axis direction AX having the center 539 of the spherical portion 531 as the origin point. The center 539 of the spherical portion 531 is located on an axial line 519 of the driving shaft 510. That is, the coupler holder 520 may have the center 539 of the spherical portion 531 of the driving coupler 530 as the origin point and pivot with respect to the driving shaft 510.

The driving coupling pin 540 is connected to the first pin insertion hole 512 and the second pin insertion hole 533, and an end portion of the driving coupling pin 540 is inserted into the coupling groove 524. As movement of the driving coupler 530 in the axis direction AX is regulated (e.g., limited, controlled or guided) by the driving coupling pin 540, the driving coupler 530 may remain in a state of being combined (or coupled) with the driving shaft 510. As the driving coupling pin 540 delivers a rotation power of the driving shaft 510 to the coupler holder 520 via the driving coupler 530, the driving shaft 510, the driving coupler 530, and the coupler holder 520 may rotate together. Accordingly, driving power of the driving shaft 510 may be delivered to the coupler holder 520.

The elastic member 550 applies an elastic force to the coupler holder 520, in a direction in which the separation prevention unit 525 comes into contact with the spherical portion 531. For example, a step portion 513 may be provided in the driving shaft 510. The elastic member 550 may include a compression coil spring that has an end portion 551 and another end portion 552 respectively supported by the step portion 513 and the coupler holder 520. A concave fixing groove 526, by which the other end portion 552 of the elastic member 550 is supported, may be provided at the first end portion 521 of the coupler holder 520.

The driven shaft 560 may be connected to the second end portion 522 of the coupler holder 520. A connection structure of the driven shaft 560 and the coupler holder 520 is described further below.

Figure 4:
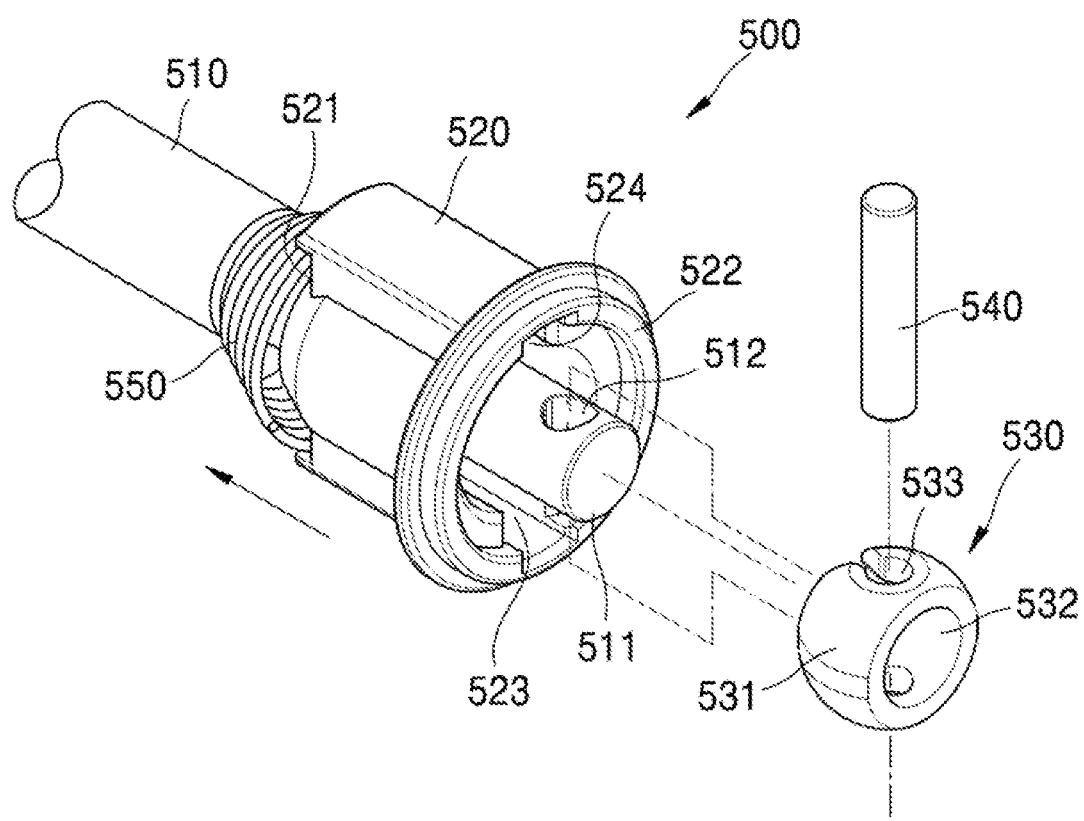
FIG. 4 is a partially exploded perspective view of the example universal coupler shown in FIG. 1.
Figure 5:
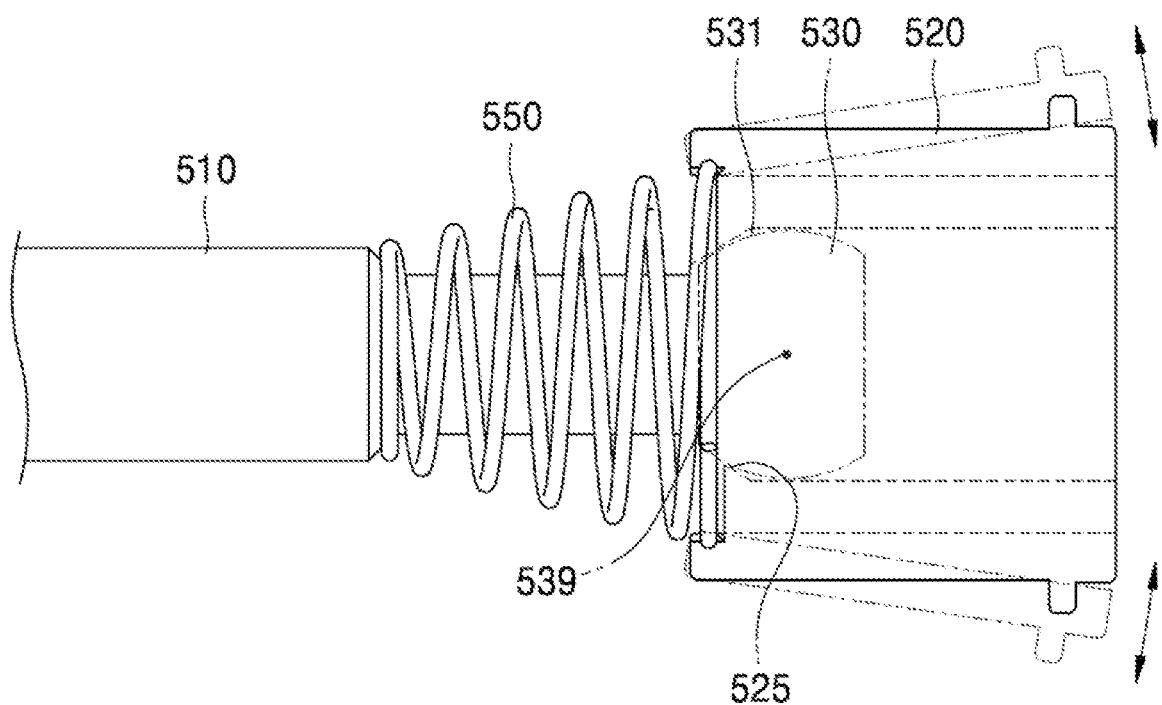
FIG. 5 is a schematic diagram illustrating an operation of the example universal coupler shown in FIG. 1.

FIG. 4 is an exploded perspective view illustrating an assembling process of the example universal coupler 500 shown in FIG. 1. FIG. 5 is a schematic diagram illustrating an operation of the example universal coupler 500 shown in FIG. 1. Referring to FIG. 4, the elastic member 550 may be inserted into the driving shaft 510. The end portion 511 of the driving shaft 510 may be inserted from the first end portion 521 of the coupler holder 520 into the bore portion 523. The coupler holder 520 may be pushed in the axis direction AX to compress the elastic member 550. The end portion 511 of the driving shaft 510 may pass through the bore portion 523 of the coupler holder 520, to be exposed through the second end portion 522. The end portion 511 of the driving shaft 510 may be inserted into the shaft insertion portion 532, such that the driving coupler 530 is combined with (or coupled with) the driving shaft 510. After aligning the first pin insertion hole 512 with the second pin insertion hole 533, the driving coupling pin 540 may be inserted into the first pin insertion hole 512 and the second pin insertion hole 533. Accordingly, the driving coupler 530 may be combined with (coupled with) the driving shaft 510 to rotate with the driving shaft 510.

As a length of the driving coupling pin 540 is greater than a diameter of the spherical portion 531 of the driving coupler 530, two end portions of the driving coupling pin 540 may extends from the driving coupler 530 (e.g., the two ends are exposed outside of the driving coupler 530). In a state where the two end portions of the driving coupling pin 540 are aligned with the coupling groove 524, the coupler holder 520 is movable in a direction of the elasticity of the elastic member 550. Accordingly, the driving coupler 530 is inserted into the bore portion 523 and the spherical portion 531 contacts the separation prevention unit 525. Due to the elasticity of the elastic member 550, the sphere portion 531 remains in contact with the separation prevention unit 525. The two end portions of the driving coupling pin 540 are inserted into the coupling groove 524. Therefore, the coupler holder 520 may be rotated with the driving coupler 530.

Accordingly, the universal coupler 500 is assembled as illustrated in FIG. 5. The driving coupling pin 540 combines (couples) the driving shaft 510 with the driving coupler 530 to rotate together, and additionally fixes the driving coupler 530 to the driving shaft 510. With reference to FIG. 5, the coupler holder 520 may remain in a state of being inclinable in an axis direction, which is orthogonal to the axis direction AX, having the center 539 of the spherical portion 531 as the origin point in a state where the bore portion 523 and the separation prevention unit 525 are in contact with the spherical portion 531 by the elasticity (or biasing force) of the elastic member 550. Therefore, as the driving coupler 530 may be fixed to the driving shaft 510 without any fixing member such as an e-ring, cost for components may be reduced and the universal coupler 500 may be realized by a relatively simple assembly process. The driving coupling pin 540 is inserted into the coupling groove 524 and prevented from withdrawal in the radius direction AR. In some examples, the driving coupling pin 540 is not inserted in an interference fit method into the first pin insertion hole 512 and the second pin insertion hole 533, but instead may be inserted in a clearance fit method. Accordingly, the driving coupling pin 540 may be inserted into the first pin insertion hole 512 and the second pin insertion hole 533 without any extra device or tool, and therefore assembly cost and/or effort may be reduced.

Figure 6:
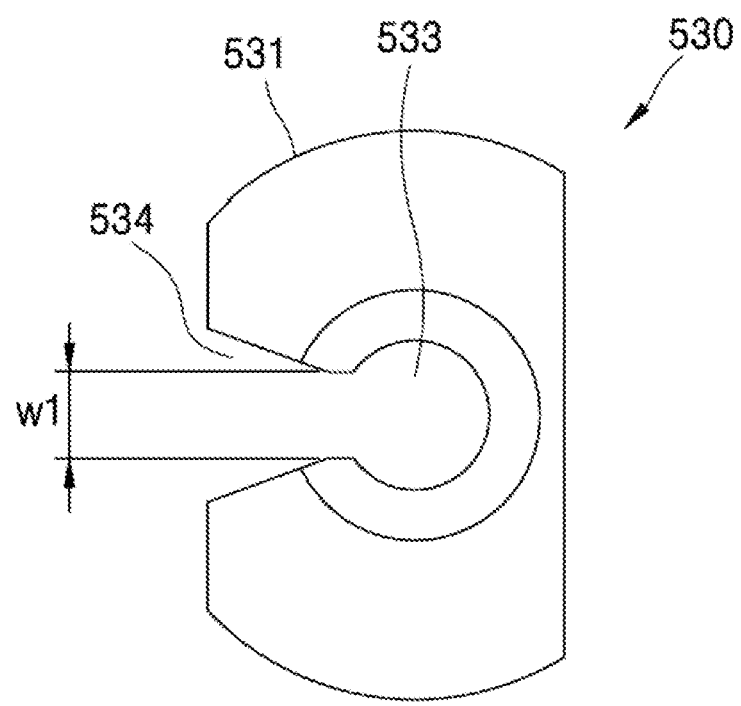
FIG. 6 is a top-plan view of an example driving coupler.

With reference to FIG. 6, in an example of the driving coupler 530, an incision groove 534 formed along the axis direction AX from the second pin insertion hole 533, in the spherical portion 531. A width W1 of the incision groove 534 may be less than a diameter of the driving coupling pin 540. The incision groove 534 may widen away from the second pin insertion hole 533. When the end portion 511 of the driving shaft 510 is inserted into the shaft insertion portion 532 in a state where the driving coupling pin 540 is inserted into the first pin insertion hole 512, the incision groove 534 may elastically expand and allow the driving coupling pin 540 to be inserted into the second pin insertion hole 533. The driving coupler 530 may include a material, for example, polyoxymethylene (POM), which enables elastic expansion/reduction of the incision groove 534.

With reference to FIG. 4, the elastic member 550 may be inserted into the driving shaft 510, the end portion 511 of the driving shaft 510 may be inserted into the bore portion 523 from the first end portion 521 of the coupler holder 520, and the elastic member 550 may be compressed by pushing the coupler holder 520 in the axis direction AX to expose the end portion 511 of the driving shaft 510 through the second end portion 522 of the coupler holder 520. The driving coupling pin 540 may be inserted into the first pin insertion hole 512 of the driving shaft 510. The shaft insertion portion 532 may be aligned with the end portion 511 of the driving shaft 510 and the driving coupler 530 may be pushed in the axis direction AX. An end portion of the driving coupling pin 540 exposed to outside of the driving shaft 510 may be inserted into the incision groove 534. When a force is applied to push the driving coupler 530 in this state, as the incision groove 534 elastically broadens, the driving coupling pin 540 may pass through the incision groove 534 and be inserted into the second pin insertion hole 533. When the driving coupling pin 540 is inserted into the second pin insertion hole 533, the incision groove 534 elastically returns to an original state, and accordingly, the driving coupler 530 is combined (coupled) with the driving shaft 510 without being separated in the axis direction AX.

Accordingly, difficulties in assembly due to a misalignment of the first pin insertion hole 512 relative to the second pin insertion hole 533 when assembling the driving coupler 530 and the driving shaft 510, may be reduced and an assembly operation may be improved.

Figure 7:
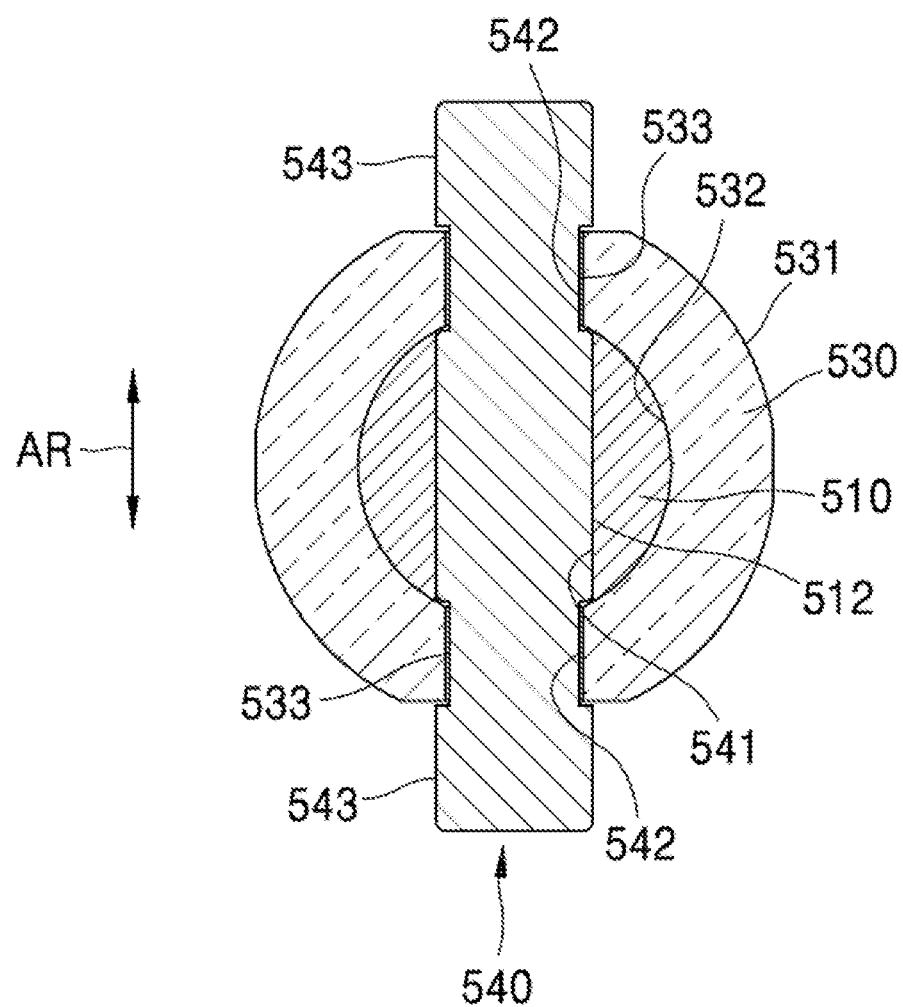
FIG. 7 is a cross-sectional view of an example structure including a driving coupler and a driving shaft.

FIG. 7 is a cross-sectional view of an example combination structure of the driving coupler 530 and the driving shaft 510. The driving coupler 530 is similar to the driving coupler 530 shown in FIG. 6. For example, the incision groove 534 formed in the axis direction AX from the second pin insertion hole 533 is provided in the spherical portion 531 of the driving coupler 530. The incision groove 534 may broaden (widen) away from the second pin insertion hole 533. When the end portion 511 of the driving shaft 510 is inserted into the shaft insertion portion 532 in a state where the driving coupling pin 540 is inserted into the first pin insertion hole 512, the incision groove 534 elastically broadens and allows the driving coupling pin 540 to be inserted into the second pin insertion hole 533.

The driving coupling pin 540 may include a first diameter portion 541 inserted into the first pin insertion hole 512, second diameter portions 542 inserted into the second pin insertion holes 533, and third diameter portions 543 inserted into the coupling grooves 524. The second diameter portions 542 are located at two end portions of the first diameter portion 541 and the third diameter portions 543 are located at two end portions of the second diameter portions 542. A diameter of the second diameter portion 542 is less than a diameter of the first diameter portion 541. The diameter of the third diameter portion 543 is identical to the diameter of the first diameter portion 541. The width W1 (cf. FIG. 6) of the incision groove 534 may be less than a diameter of the driving coupling pin 540.

Accordingly, with reference to FIG. 4, the elastic member 550 may be inserted into the driving shaft 510, an end portion of the driving shaft 510 may be inserted from the first end portion 521 of the coupler holder 520 into the bore portion 523, and the elastic member 550 may be compressed by pushing the coupler holder 520 in the axis direction AX to expose the end portion 511 of the driving shaft 510 through the second end portion 522 of the coupler holder 520. The driving coupling pin 540 may be inserted into the first pin insertion hole 512 of the driving shaft 510. The second diameter portion 542 and the third diameter portion 543 of the driving coupling pin 540 are exposed to outside of the driving shaft 510. The shaft insertion portion 532 may be aligned with the end portion 511 of the driving shaft 510 and the driving coupler 530 may be pushed in the axis direction AX. The second diameter portion 542 of the driving coupling pin 540 may be inserted into the incision groove 534. In this state, when a force is applied to push the driving coupler 530, as the incision groove 534 elastically broadens, the second diameter portion 542 of the driving coupling pin 540 may pass through the incision groove 534 and be inserted into the second pin insertion hole 533. As the incision groove 534 is elastically restored to the original state, the driving coupler 530 is combined (coupled) with the driving shaft 510 without being separated in the axis direction AX. The third diameter portion 543 of the driving coupling pin 540 is exposed to outside of the driving coupler 530. The second diameter portion 542 that is more concave (e.g, more recessed) than the first diameter portion 541 and the third diameter portion 543 is locked at a rim of the second pin insertion hole 533, and therefore, the driving coupling pin 540 is not separated in the radius direction AR from the first pin insertion hole 512 and the second pin insertion hole 533. Accordingly, the driving coupler 530 and the driving shaft 510 may be more stably combined (combined) with each other. In addition, as the movement in the radius direction AR of the driving coupling pin 540 is regulated (e.g., limited, controlled or guided), a contact state of the third diameter portion 543 and the coupling groove 524 of the coupler holder 520 may be maintained uniform, and thus, rotation power of the driving shaft 510 may be delivered in a more stable manner to the coupler holder 520.

The driven shaft 560 may be connected to the coupler holder 520 to be rotated with the coupler holder 520. As an example, a connection structure of the driven shaft 560 and the coupler holder 520 may be identical or similar to the example connection structure of the driving shaft 510 and the coupler holder 520.

Figure 8:
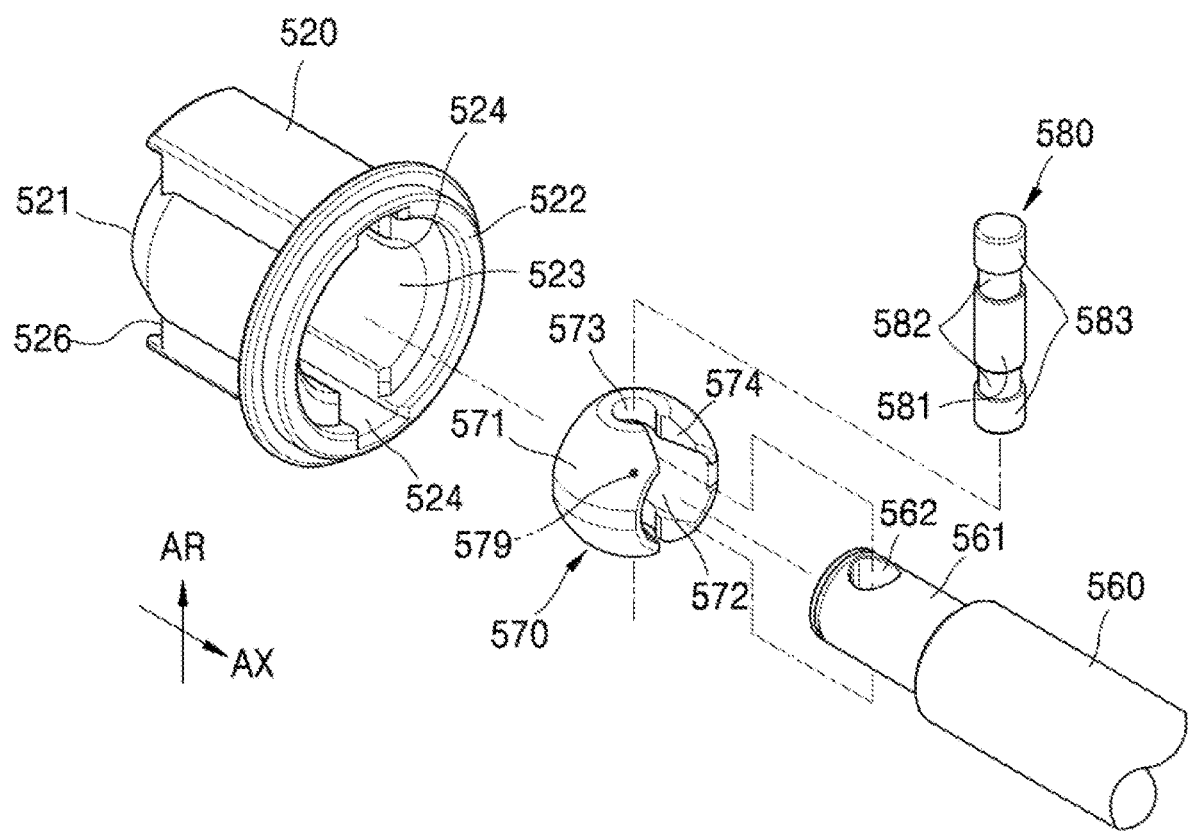
FIG. 8 is an exploded perspective view illustrating a connection structure of an example driven shaft and an example coupler holder.

FIG. 8 is an exploded perspective view of an example of the connection structure of the driven shaft 560 and the coupler holder 520. Referring to FIG. 8, a third pin insertion hole 562 is provided at an end portion 561 of the driven shaft 560. The third pin insertion hole 562 is formed through the driven shaft 560 in the radius direction AR orthogonal to the axis direction AX. The coupler holder 520 is identical or similar to the coupler holder 520 described with reference to FIGS. 1 to 3.

A driven coupler 570 may be identical or similar to the driving coupler 530 (cf. FIG. 2). The driven coupler 570 may include a second spherical portion 571, a second shaft insertion portion 572, and a fourth pin insertion hole 573. The second spherical portion 571 is inserted from the second end portion 522 of the coupler holder 520 into the bore portion 523 to support the coupler holder 520 to be inclined with respect to the driven shaft 560. The second shaft insertion portion 572 formed through the second spherical portion 571 in the axis direction AX to allow the end portion 561 of the driven shaft 560 to be inserted. The fourth pin insertion hole 573 that penetrates the second spherical portion 571 in the radius direction AR. In some examples, at least a portion of the second spherical portion 571 may be spherical. For example, a portion of the second spherical portion 571 that contacts the bore portion 523 when the coupler holder 520 inclines with respect to the axis direction AX having a center 579 of the second spherical portion 571 as an origin point, may follow a spherical shape.

An example driven coupling pin 580 may be inserted into the third pin insertion hole 562 and the fourth pin insertion hole 573, and an end portion of the driven coupling pin 580 may be inserted into the coupling groove 524. As movement in the axis direction AX of the driven coupler 570 is regulated (e.g., limited, controlled or guided) by the driven coupling pin 580, the driven coupler 570 may remain in a state of being combined (e.g., coupled) with the driven shaft 560. The rotation power of the coupler holder 520 may be delivered to the driven shaft 560, via the driven coupling pin 580, and the driving shaft 510 (cf. FIG. 2), the driving coupler 530, the coupler holder 520, the driven coupler 570, and the driven shaft 560 may rotate together.

Accordingly, even when there is misalignment between the driving shaft 510 and the driven shaft 560, the coupler holder 520 may rotate in a state of being inclined with respect to the axis direction AX, and thus, the rotation power of the driving shaft 510 may be more stably delivered to the driven shaft 560. In addition, the coupler holder 520 may be inclined with respect to the driving shaft 510 having the center 539 of the spherical portion 531 of the driving coupler 530 as the origin point. Furthermore, the coupler holder 520 may be inclined with respect to the driven shaft 560 having the center 579 of the second spherical portion 571 of the driven coupler 570 as the origin point. Accordingly, the example universal coupler may deliver the rotation power of the driving shaft 510 to the driven shaft 560 in a more stable manner despite a misalignment, and cause the driven shaft 560 to rotate at a fixed speed in a more stable manner.

The example structure of the driving coupler 530 shown in FIGS. 6 and 7 may also be applied similarly to the driven coupler 570. With reference to FIG. 8, a second incision groove 574 may be formed in the axis direction AX from the fourth pin insertion hole 573, in the second spherical portion 571. A width of the second incision groove 574 may be less than a diameter of the driven coupling pin 580. The second incision groove 574 may gradually widen away from the fourth pin insertion hole 573. When the end portion 561 of the driven shaft 560 is inserted into the second shaft insertion portion 572 in a state where the driven coupling pin 580 is inserted into the third pin insertion hole 562, the second incision groove 574 elastically broadens and allows the driven coupling pin 580 to be inserted into the fourth pin insertion hole 573. When the driven coupling pin 580 is inserted into the fourth pin insertion hole 573, the second incision groove 574 elastically returns to an original state, and thus, the driven coupler 570 is combined (coupled) with the driven shaft 560 without being separated in the axis direction AX. According to this configuration, a difficulty of assembly caused by a misalignment of the third pin insertion hole 562 relative to the fourth pin insertion hole 573 when the driven coupler 570 is combined (coupled) with the driven shaft 560, may be reduced, and assembly may be improved.

The example driven coupling pin 580 may include a fourth diameter portion 581, a fifth diameter portion 582, and a sixth diameter portion 583. The fourth diameter portion 581 inserted into the third pin insertion hole 562. The fifth diameter portion 582 inserted into the fourth pin insertion hole 573. The sixth diameter portion 583 inserted into the coupling groove 524. The fifth diameter portions 582 are located at two end portions of the fourth diameter portion 581 and the sixth diameter portions 583 are located at two end portions of the fifth diameter portions 582. A diameter of the fifth diameter portion 582 is less than a diameter of the fourth diameter portion 481. A diameter of the sixth diameter portion 583 is identical to the diameter of the fourth diameter portion 581. A width of the second incision groove 574 may be less than the diameter of the fifth diameter portion 582. The driven coupling pin 580 is inserted into the third pin insertion hole 562 of the driven shaft 560. The fifth diameter portions 582 and the sixth diameter portions 583 of the driven coupling pin 580 are exposed to outside of the driven shaft 560. The second shaft insertion portion 572 is aligned with the end portion 561 of the driven shaft 560 to push the driven coupler 570 in the axis direction AX. The fifth diameter portion 582 of the driven coupling pin 580 is inserted into the second incision groove 574. In this state, when a force to push the driven coupler 570 is applied, as the second incision groove 574 elastically widens, the fifth diameter portion 582 of the driven coupling pin 580 may pass through the second incision groove 574 and may be inserted into the fourth pin insertion hole 573. As the second incision groove 574 is elastically restored to an original state, the driven coupler 570 is combined (coupled) with the driven shaft 560 without being separated in the axis direction AX. The sixth diameter portions 583 of the driven coupling pin 580 are exposed to outside of the driven coupler 570. As the fifth diameter portion 582 that is more concave (e.g., more recessed) than the fourth diameter portion 581, and the sixth diameter portion 583 is locked at a rim of the fourth pin insertion hole 573, the driven coupling pin 580 is not separated in the radius direction AR from the third insertion hole 562 and the fourth pin insertion hole 573. Accordingly, the driven coupler 570 and the driven shaft 560 may be combined (coupled) with each other in a more stable manner. In addition, as the movement in the radius direction AR of the driven coupling pin 580 is regulated (e.g., limited, controlled or guided), a contact state of the sixth diameter portions 583 and the coupling grooves 524 of the coupler holder 520 may be maintained more uniform, and thus, the rotation power of the driving shaft 510 may be delivered to the driven shaft 560 via the coupler holder 520, in a more stable manner.

The above-described examples of the universal coupler 500 may be applied to an image forming apparatus that prints an image on a printing medium P in an electrophotographic method.

Figure 9:
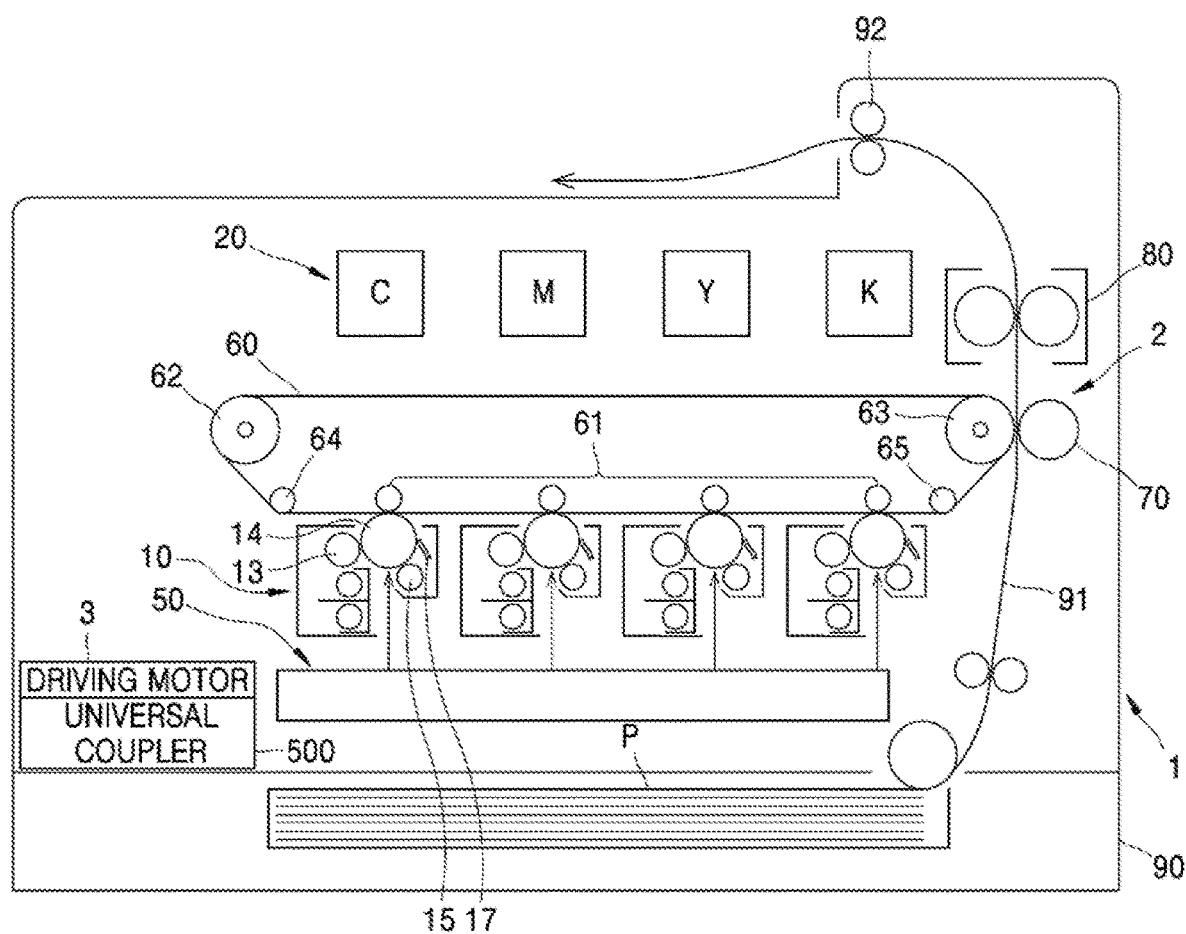
FIG. 9 is a schematic configuration diagram of an example electrophotographic image forming apparatus.

FIG. 9 is a schematic configuration diagram of an example electrophotographic image forming apparatus. Referring to FIG. 9, the example electrophotographic image forming apparatus may include a main body 1 and a feeding cassette 90. The main body 1 includes a printing device (e.g., printing unit) 2 that prints an image on a printing medium P. To print a color image, the printing unit 2 may include a plurality of development cartridges 10, an exposure device (exposure unit) 50, a transfer device (e.g., transfer unit), and a fixing device (fixing unit) 80.

The development cartridge 10 may include at least one of a photoconductor, on which an electrostatic latent image is formed, and a developing roller that supplies toner to the electrostatic latent image and develops the electrostatic latent image. The development cartridge 10 may be attached to and detached from the main body 1. The transfer unit may include an intermediate transfer belt 60, to which a toner image formed on the photoconductor is transferred, and supporting rollers 62, 63, 64, and 65 that support and drive the intermediate transfer belt 60.

The image forming apparatus may include a plurality of developer cartridges 20 that contain developer. The plurality of developer cartridges 20 are respectively connected to the plurality of development cartridges 10, and the developer in the plurality of developer cartridges 20 is supplied to each of the plurality of development cartridges 10.

The plurality of development cartridges 10 may include a plurality of development cartridges 10C, 10M, 10Y, and 10K for forming toner images having cyan (c), magenta (M), yellow (Y), and black (K) colors. In addition, the plurality of developer cartridges 20 may include a plurality of developer cartridges 20C, 20M, 20Y, and 20K respectively containing cyan (C), magenta (M), yellow (Y), and black (K) colors of developer to be provided to the plurality of developing cartridges 10C, 10M, 10Y, and 10K. In addition to the above-mentioned colors, the image forming apparatus may further include more of the developer cartridges 20 for containing various colors of developers such as light magenta or white and the development cartridges for developing images of the various colors. Hereinafter, a printer that includes the plurality of development cartridges 10C, 10M, 10Y, and 10K and the plurality of developer cartridges 20C, 20M, 20Y, and 20K is described, and unless differently mentioned, reference numerals having C, M, Y, and K respectively refer to components for developing developers having the cyan (C), magenta (M), yellow (Y), and black (K) colors, respectively.

The development cartridge 10 may include a photoconductive drum 14, on which an electrostatic latent image is formed, and a developing roller 13 that supplies the developer to the electrostatic latent image and develops the electrostatic latent image into a visible toner image. The photoconductive drum 14, which is an example of a photoconductor on which the electrostatic latent image is formed, may include a conductive metal pipe and a photoconductive layer formed at an outer circumference of the conductive metal pipe. A charging roller 15 is an example of a charger which charges a surface of the photoconductive drum 14 to have a uniform electric potential. A charging brush, a corona charger, and the like may be employed instead of the charging roller 15.

In some examples, the development cartridge 10 may further include a charging roller cleaner that removes foreign materials such as developer or dust attached to the charging roller 15, a cleaning member 17 that removes developer remaining on the surface of the photoconductive drum 14 after an intermediate transfer process, a regulating member that regulates (e.g., limits) an amount of developer to be provided to the developing area in which the photoconductive drum 14 and the developing roller 13 face each other, and the like. The cleaning member 17 may include, for example, a cleaning blade that is in contact with a surface of the photoconductive drum 14 and scrapes the developer from the surface of the photoconductive drum 14. In some examples, the cleaning member 17 may include a cleaning brush that is in contact with the surface of the photoconductive drum 14 while rotating, to scrape off the developer from the surface of the photoconductive drum 14 while the photoconductive drum 14 rotates.

The developer contained in the developer cartridge 20, for example, the toner, is supplied to the development cartridge 10. The developing roller 13 may be spaced apart from the photoconductive drum 14. A distance between an outer circumference of the developing roller 13 and an outer circumference of the photoconductive drum 14 may vary, for example, from tens of micrometers to hundreds of micrometers. The developing roller 13 may be a magnetic roller. In addition, the developing roller 13 may have the form in which a magnet is fixedly (e.g, not rotatably) arranged in a rotating development sleeve. The toner is mixed with carrier particles within the development cartridge 10, and the toner is attached to a surface of a magnetic carrier particle. The magnetic carrier particles are transferred to the surface of the developing roller 13 and transported to a developing area in which the photoconductive drum 14 and the developing roller 13 faces each other. A regulating member regulates an amount (e.g., limits a thickness) of developer transported to the developing area. In response to a developing bias voltage applied between the developing roller 13 and the photoconductive drum 14, the toner attached to the magnetic carrier particles is supplied to the photoconductive drum 14, so as to develop the electrostatic latent image, which is formed on the surface of the photoconductive drum 14, into a visible toner image.

To form the electrostatic latent image, the exposure unit 50 irradiates light modulated to correspond to image information, onto the photoconductive drum 14 and forms the electrostatic latent image on the photoconductive drum 14. Examples of the exposure unit 50 include a laser scanning device (e.g, laser scanning unit (LSU)) which uses a laser diode as a light source or a light-emitting diode (LED) exposure which uses a LED as a light source.

The transfer unit transfers the toner image formed on the photoconductive drum 14 to the printing medium P. In some examples, a transfer of an intermediate transfer type is employed. As an example, the transfer unit may include an intermediate transfer belt 60, a plurality of intermediate transfer rollers 61, and a transfer roller 70.

The intermediate transfer belt 60 may temporarily carry toner images formed on the photoconductive drums 14 from the plurality of development cartridges 10C, 10M, 10Y, and 10K. The plurality of intermediate transfer rollers 61 are arranged at positions facing the photoconductive drums 14 of the plurality of development cartridges 10C, 10M, 10Y, and 10K, with the intermediate transfer belt 60 between the plurality of intermediate transfer rollers 61. An intermediate transfer bias voltage is applied to the plurality of intermediate transfer rollers 61, in order to intermediately-transfer the toner images developed on the photoconductive drums 14 to the intermediate transfer belt 60. In some examples, a corona transfer or a pin scorotron type transfer may be employed instead of the intermediate transfer roller 61.

The transfer roller 70 is located at a position to face the intermediate transfer belt 60. A transfer bias voltage to transfer the toner images, which are transferred to the intermediate transfer belt 60, to the printing medium P is applied to the transfer roller 70.

The fixing unit 80 applies heat and/or pressure to the toner images transferred to the printing medium P and fixes the toner images on the printing medium P. A form of the fixing unit 80 is not limited to the example shown in FIG. 9.

In some examples, the exposure unit 50 irradiates a plurality of lights which are modulated to corresponding to image information of the respective colors, to the photoconductive drums of the plurality of development cartridges 10C, 10M, 10Y, and 10K, in order to form electrostatic latent images on the photoconductive drums 14. The electrostatic latent images of the photoconductive drums 14 of the plurality of development cartridges 10C, 10M, 10Y, and 10K are developed into visible toner images by C, M, Y, and K developers which are supplied from the plurality of developer cartridges 20C, 20M, 20Y, and 20K to the plurality of development cartridges 10C, 10M, 10Y, and 10K. The developed toner images are sequentially intermediately-transferred to the intermediate transfer belt 60. The printing medium P loaded in the feeding cassette 90 is transported along a feeding path 91 and transported between the transfer roller 70 and the intermediate transfer belt 60. In response to a transfer bias voltage applied to the transfer roller 70, the toner images intermediately-transferred on the intermediate transfer belt 60 are transferred onto the printing medium P. When the printing medium P passes through the fixing unit 80, the toner images are fixed onto the printing medium P due to heat and pressure. The printing medium P, on which the fixing is completed, is discharged by a discharge roller 92.

The printing unit 2 may include at least one driven shaft. The driven shaft may be connected to a driving motor 3 by the example universal coupler 500. Examples shown in FIGS. 1 to 8 may be employed as the universal coupler 500.

Referring to FIG. 9, the intermediate transfer belt 60 may be supported and driven by the plurality of supporting rollers 62, 63, 64, and 65. The intermediate transfer belt 60 may be replaced. For example, the intermediate transfer belt 60, the plurality of supporting rollers 62, 63, 64, and 65, and the plurality of intermediate transfer rollers 61 may be replaced in the form of an intermediate transfer belt assembly. One of the plurality of supporting rollers 62, 63, 64, and 65, for example, the supporting roller 63, may be connected to the driving motor 3, to rotate.

A universal coupler 500 as shown in FIGS. 1 to 8 may be employed to connect one of the supporting rollers 62, 63, 64, and 65 of the intermediate transfer belt assembly to the driving motor 3. In this case, the driven shaft 560 may be a rotation shaft of one of the supporting rollers 62, 63, 64, and 65, such as a rotation shaft of the supporting rollers 63, for example.

When replacing the intermediate transfer belt assembly, the driven shaft 560 and the driven coupler 570 are separated from the coupler holder 520. To do so, the coupler holder 520 is pushed in a direction opposite to the elasticity (biasing force) of the elastic member 550. Accordingly, the driven shaft 560 and the driven coupler 570 may be exposed out from the second end portion 522 of the coupler holder 520, and thus, the driven shaft 560 and the driven coupler 570 may be separated from the coupler holder 520. The intermediate transfer belt assembly may thus be separated from the printing unit 2. To mount a new intermediate transfer assembly in the printing unit 2, the coupler holder 520 may be pushed in a direction opposite to the elasticity (e.g., biasing force) of the elastic member 550 to align the driven shaft 560, driven coupler 570, and the driven coupling pin 580 in the coupling groove 524 of the coupler holder 520. The coupler holder 520 may then be moved in the direction of the elasticity (e.g., biasing force) of the elastic member 550. Accordingly, a connection between the driven shaft 560, the driven coupler 570, the driven coupling pin 580, and the coupler holder 520 may be completed.

By employing a universal coupler 500 according to the examples described above, power between the driving motor 3 and the intermediate transfer belt assembly may be more easily connected/released, the intermediate transfer belt assembly may be more easily replaced. In addition, even when there is a misalignment between the driving shaft 510 provided in the printing unit 2 and a rotation shaft of the supporting roller 63, which is a driven shaft, the supporting roller 63 may be rotated in a more stable manner at a fixed speed to drive the intermediate transfer belt 60 at a fixed speed. Therefore, color registration errors of the toner images of cyan, magenta, yellow, and black colors intermediately-transferred on the intermediate transfer belt 60 may be minimized, and a more stable quality of a color image may be achieved.

As described above, the development cartridge 10 is attached to/detached from the main body 1. The universal coupler 500 may be employed to deliver driving power of the driving motor 3 to a rotation member included in the development cartridge 10, for example, the photoconductive drum 14, the developing roller 13, and the like. In this case, the driven shaft 560 may be provided in the development cartridge 10. The driven shaft 560 may be connected to the photoconductive drum 14, the developing roller 13, and the like by a power delivery member, for example, a gear. As another example, the driven shaft 560 may be a rotation shaft of the photoconductive drum 14.

According to this configuration, even when there is a misalignment between the driving shaft 510 provided in the printing unit 2 and the driven shaft 560 provided in the development cartridge 10, the driven shaft 560 may be rotated in a more stable manner at a fixed speed to rotate rotation members of the development cartridge 10 at a fixed speed, to improve and stabilize a quality of the printed images. For example, a printed image of more stable (or uniform) quality may be achieved.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

What is claimed is:

1. A universal coupler comprising:
   a driving shaft including a first pin insertion hole;
   a coupler holder comprising a bore which includes a first end portion adjacent the driving shaft, a second end portion opposite to the first end portion, a separation prevention member that is located at the first end portion and partially blocks the bore, and a coupling groove that is formed in the bore in a recessed manner; and
   a driving coupler comprising:
      a spherical portion that is located in the bore and in contact with the separation prevention member to support the coupler holder to be inclined with respect to the driving shaft,
      a shaft insertion portion formed through the spherical portion in an axis direction of the driving shaft, to receive the driving shaft, and
      a second pin insertion hole that penetrates the spherical portion in a radius direction;
   a driving coupling pin that is insertable into the first pin insertion hole of the driving shaft and the second pin insertion hole of the driving coupler, the driving coupling pin having an end portion that is insertable into the coupling groove; and
   an elastic member to apply elasticity to the coupler holder in a direction, to urge the spherical portion of the driving coupler against the separation prevention member.

2. The universal coupler of claim 1, wherein the coupling groove extends from the first end portion to the second end portion of the coupler holder.

3. The universal coupler of claim 1,
   wherein the spherical portion comprises an incision groove formed in the axis direction from the second pin insertion hole, and
   wherein the incision groove is elastically deformable to receive the driving coupling pin inserted into the second pin insertion hole when an end of the driving shaft is inserted into the shaft insertion portion in a state where the driving coupling pin is inserted into the first pin insertion hole.

4. The universal coupler of claim 3, wherein the driving coupling pin comprises a first diameter portion to fit into the first pin insertion hole, a second diameter portion that has a diameter less than the first diameter portion to fit into the second pin insertion hole, and a third diameter portion that has a diameter identical to the first diameter portion to fit into the coupling groove.

5. The universal coupler of claim 4, wherein a width of the incision groove is less than a diameter of the second diameter portion.

6. The universal coupler of claim 1, comprising:
a driven shaft having a third pin insertion hole; and
a driven coupler comprising:
- a second spherical portion insertable from the second end portion of the coupler holder into the bore to support the coupler holder to be inclined with respect to the driven shaft,
- a second shaft insertion portion that is formed through the second spherical portion in the axis direction to allow an end of the driven shaft to be inserted, and
- a fourth pin insertion hole that penetrates the second spherical portion in the radius direction; and
a driven coupling pin that is insertable into the third pin insertion hole and the fourth pin insertion hole, the driven coupling pin having an end portion that is insertable into the coupling groove.

7. The universal coupler of claim 6,
wherein the driven coupling pin comprises a fourth diameter portion to fit into the third pin insertion hole, a fifth diameter portion that has a diameter less than the fourth diameter portion to fit into the fourth pin insertion hole, and a sixth diameter portion that has a diameter identical to the fourth diameter portion to fit into the coupling groove, and
wherein the second spherical portion comprises a second incision groove formed in the axis direction from the fourth pin insertion hole and having a width less than the diameter of the fifth diameter portion, wherein the second incision groove is elastically deformable to insert the fifth diameter portion of the driven coupling pin into the fourth pin insertion hole when the end of the driven shaft is inserted into the second shaft insertion portion.

8. The universal coupler of claim 1,
wherein the driving shaft has a step portion, and
wherein the elastic member comprises a compression coil spring having a first end to contact the step portion and a second end to contact the coupler holder.

9. An image forming apparatus comprising:
a printing device to form an image on a printing medium according to an electrophotographic method, wherein the printing device comprises a driven shaft;
a driving motor; and
a universal coupler connecting the driving motor to the driven shaft,
wherein the universal coupler comprises:
- a driving shaft including a first pin hole, the driving shaft rotatably coupled to the driving motor;
- a coupler holder connected to the driven shaft, the coupler holder comprising a bore which includes a first end facing the driving shaft and a second end opposite to the first end, a stopper located at the first end to partially block the bore, and a coupling groove that is formed in the bore;
- a driving coupler comprising a spherical portion located in the bore adjacent the stopper, to support the coupler holder to be inclined with respect to the driving shaft, a shaft insertion portion formed through the spherical portion in an axis direction of the driving shaft to receive the driving shaft therein, and a second pin hole that penetrates the spherical portion in a radius direction;
- a driving coupling pin that is insertable into the first pin hole of the driving shaft and the second pin hole of the driving coupler, the driving coupling pin having an end to engage the coupling groove; and
- an elastic member to apply an elastic force to the coupler holder in a direction that urges the spherical portion of the driving coupler to contact the stopper.

10. The image forming apparatus of claim 9, wherein the spherical portion comprises an incision groove formed in the axis direction from the second pin hole, wherein the incision groove is elastically deformable to insert the driving coupling pin into the second pin hole when the driven shaft is inserted into the shaft insertion portion in a state where the driving coupling pin is inserted into the first pin hole of the driving shaft.

11. The image forming apparatus of claim 10,
wherein the driving coupling pin comprises a first diameter portion to fit into the first pin hole, a second diameter portion that has a diameter less than the first diameter portion to fit into the second pin hole, and a third diameter portion that has a diameter identical to the first diameter portion to fit into the coupling groove, and
wherein a width of the incision groove is less than a diameter of the second diameter portion.

12. The image forming apparatus of claim 9, comprising:
a third pin hole provided in the driven shaft;
a driven coupler comprising a second spherical portion located in the bore of the coupler holder to support the coupler holder to be inclinable with respect to the driven shaft, a second shaft insertion portion that is formed through the second spherical portion in the axis direction to allow the driven shaft to be inserted therein, and a fourth pin hole that penetrates the second spherical portion in the radius direction; and
a driven coupling pin that is insertable into the third pin hole and the fourth pin hole, the driven coupling pin having an end to engage the coupling groove,
wherein the coupling groove extends from the first end to the second end of the coupler holder.

13. The image forming apparatus of claim 12,
wherein the driven coupling pin comprises a fourth diameter portion to fit into the third pin hole, a fifth diameter portion that has a diameter less than the fourth diameter portion to fit into a fourth pin hole, and a sixth diameter portion that has a diameter identical to the fourth diameter portion to fit into the coupling groove, and
wherein the second spherical portion comprises a second incision groove formed in the axis direction from the fourth pin hole and having a width less than the diameter of the fifth diameter portion, the second incision groove that is elastically deformable to expand when the driven shaft is inserted into a second shaft insertion portion and to insert the fifth diameter portion of the driven coupling pin into the fourth pin hole.

14. The image forming apparatus of claim 9,
wherein the printing device comprises an intermediate transfer belt, to receive a toner image formed on a photoconductor, and supporting rollers to support and drive the intermediate transfer belt, and
wherein the driven shaft is a rotation shaft of one of the supporting rollers.

15. The image forming apparatus of claim 9,
wherein the printing device comprises a development cartridge that is removably attachable to the printing device,
wherein the development cartridge comprises at least one of a photoconductor to form an electrostatic latent image or a developing roller to supply toner to the electrostatic latent image to develop the electrostatic latent image, and wherein the driven shaft is located in the development cartridge.

* * * * *